United States Patent [19]
Di Peri

[11] 3,933,448
[45] Jan. 20, 1976

[54] GAS SEPARATOR FOR LIQUID SUPPLY

[76] Inventor: Leonard J. Di Peri, 18325 Lahey St., Northridge, Calif. 91324

[22] Filed: Aug. 20, 1971

[21] Appl. No.: 173,548

[52] U.S. Cl. .................................. 55/159; 55/182
[51] Int. Cl.[2] ........................................ B01D 53/22
[58] Field of Search ....... 55/159, 182; 222/187, 189

[56] References Cited
UNITED STATES PATENTS

| | | | |
|---|---|---|---|
| 3,486,302 | 12/1969 | Paynter | 55/159 |
| 3,492,793 | 2/1970 | Bhuta et al. | 55/159 |

OTHER PUBLICATIONS

Paynter et al., "*Capillary Systems for Storable Propellants,*" Martin Marietta Corporation, Denver, Colo., Section Report No. 1660-1667-1668, 1967, pp. 1 to 4, 25 and 26.

*Primary Examiner*—Charles N. Hart

[57] ABSTRACT

A surface tension device for use in a liquid acquisition reservoir and comprised of a porous membrane that maintains a separation between gas and liquid and thereby isolates accummulated gas from the liquid acquired and subsequently delivered free of entrained gases; and comprised of a porous baffle held spaced from the vessel wall and establishing a liquid acquisition chamber separated from the liquid a storage chamber and wherein pure liquid is acquired and subsequently withdrawn through an opening; the baffle being characterized by its ski-shape as it is installed within the confines of a cylindrical storage vessel with hemispherical ends and to the end that substantially complete acquisition of the available liquid from the resevoir is assured.

2 Claims, 5 Drawing Figures

U.S. Patent  Jan. 20, 1976  3,933,448
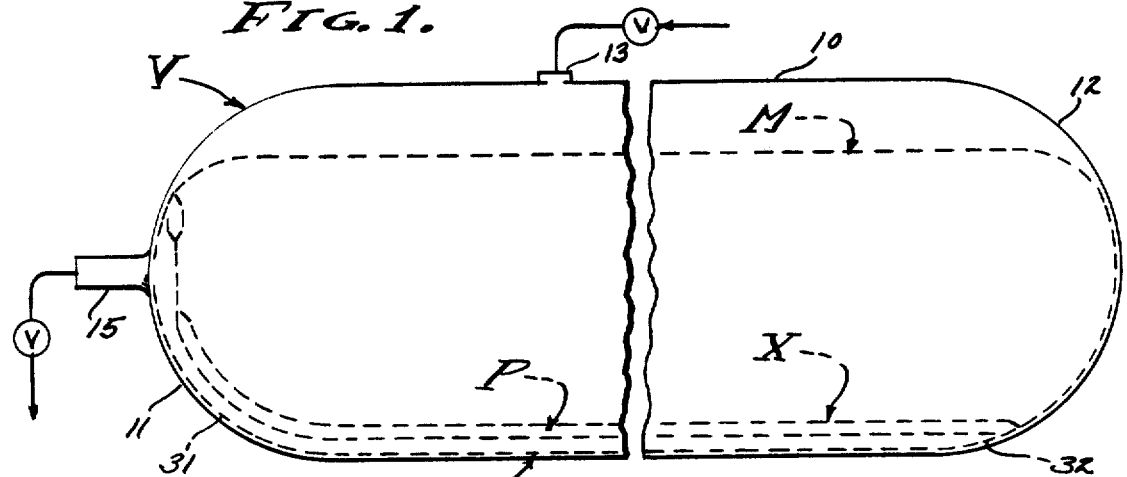
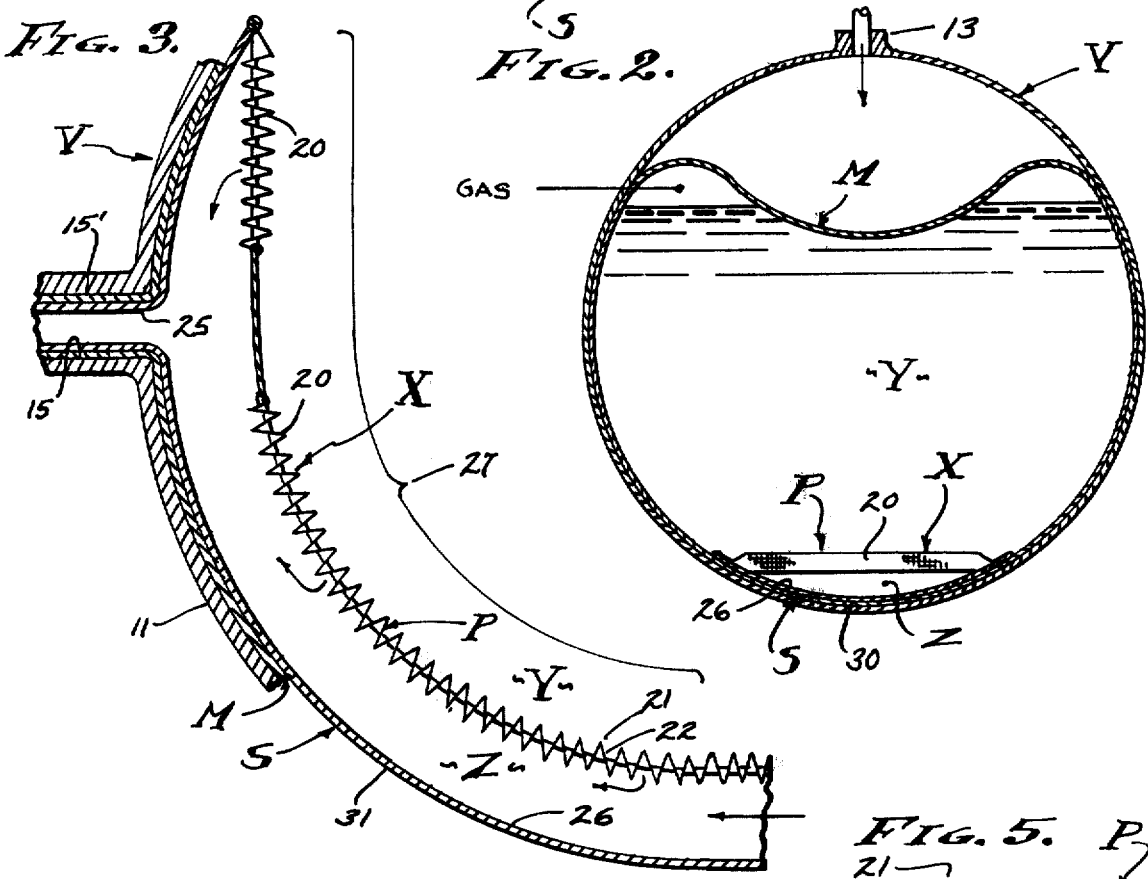
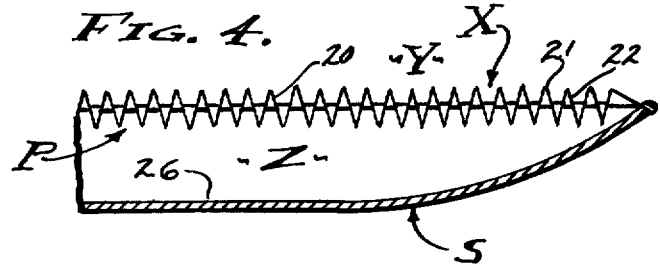
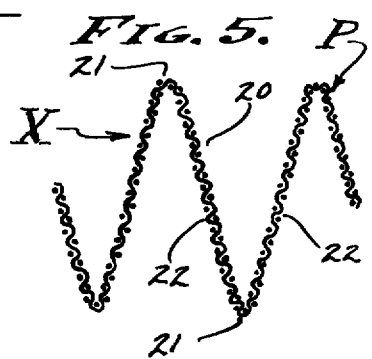

GAS SEPARATOR FOR LIQUID SUPPLY

BACKGROUND

The storage of liquid such as exotic fuels to be utilized in aircraft and the like which assume various attitudes and which are subjected to accelerating and decelerating forces when in flight is of primary concern. For example, it is required that liquid Hydrazine be stored for long periods of time and used in emergency situations, and it is imperative that the fuel be free of gas pockets and/or entrained bubbles, this requirement being complicated by gravitational reversals and the like at critical moments and by the fact that gas pockets and excess entrainment of gas cannot be tolerated in certain equipment utilizing the liquid fuel. To a degree, a questionable solution to the problem has been the isolation of such liquids within collapsible membranes which are initially purged of gas and which theoretically will supply pure liquid. However in actuality, the stored supply of such liquid will liberate gases in time due to deterioration, etc. and all to the end that the intolerable gases are eventually present and not always detectible in advance of emergency situations when the availability of such liquids is critical.

FIELD OF INVENTION

In view of the foregoing, it is an object of this invention to provide means which assures the exclusion of gas from a liquid supply line, and wherein a liquid acquisition opening is maintained in constant communication with the liquid supply and isolated from any accummulation of gas as may be caused by deterioration of said liquid or otherwise.

An object of this invention is to provide a liquid acquisition device and liquid storage vessel combination which is operable in various attitudes and when subjected to accelerating and decelerating forces. With the present invention substantially large area of screen is employed and through which the stored liquid will pass while the surface tension phenomenon at and between the elements of the screen prevents passage of gases therethrough; and it is the arrangement of the said screen with respect to the configuration of the liquid storage vessel and its liquid acquisition opening which is unique as hereinafter disclosed. As a consequence pure liquid is acquired despite the otherwise adverse attitudes and forces which are likely to be encountered.

SUMMARY OF INVENTION

The surface tension device X that I provide is incorporated within a liquid storage vessel V and combined therewith in such a manner that a liquid gas interface is maintained and through which liquid is free to pass while gas is restricted; and thereby establishing the gas and liquid separation which is required. The surface tension device X can take various configurations dependent upon the form and disposition of the liquid storage vessel V into which it is to be incorporated, and device X characteristically conforms to the interior wall configuration of the vessel V and is therefore ski-shaped when combined with a cylindrical vessel and this being the preferred form of the invention. The surface tension is established by an ultrafine mesh partition P of the characteristic ski configuration spaced from the interior wall of vessel V and with the perimeter of the partition coextensively sealed to the interior wall of the vessel and thereby establishing separated liquid storage and liquid acquisition chambers Y and Z. Thus, the gas separating surface tension device X for a liquid supply which I will now describe in detail involves, generally, the partition P which establishes a gas-liquid interface between the liquid storage chamber Y and the liquid acquisition chamber Z a bottom shell S that is spaced from the partition P and which thereby establishes the acquisition chamber Z, and an acquisition opening 15, there being a diaphragm or membrane M into which the liquid supply is charged and from which gas is initially purged.

DRAWINGS

The various objects and features of this invention will be fully understood from the following detailed description of the typical preferred form and application thereof, throughout which description reference is made to the accompanying drawings, in which:

FIG. 1 is a side elevation of a typical liquid storage vessel with the surface tension device incorporated therein.

FIG. 2 is an enlarged sectional view taken as indicated by line 2—2 on FIG. 1.

FIG. 3 is an enlarged detailed sectional view illustrating the delivery end of the surface tension device.

FIG. 4 is an enlarged detailed sectional view illustrating the opposite closed end of the surface tension device and, FIG. 5 is a detailed fragmentary section illustrating the pleated surface tension element which characterizes the present invention.

PREFERRED EMBODIMENT

The liquid storage vessel V which is charged with liquid for subsequent acquisition can take many forms and/or special configurations, and normally contains a body of liquid subject to gravity filling the vessel V to full capacity. Such vessels can be rectangular, or spherical, and in the present case cylindrical with hemispherical ends; in which case the vessel V has an interior wall comprised of an elongated cylindrical section 10 closed at opposite ends by hemispherical sections 11 and 12. The vessel wall is imperforate with the exception of the various service openings that may be required in order to fill and purge and to depleat the interior as circumstances require. For example, there is a fluid charging opening 13, and an acquisition opening 15, all of which open into the interior of the vessel V and which are valve controlled as indicated.

The attitude of vessel V is normally horizontal while it is subject to various attitudes or positioning with respect to gravity and/or the equivalent G forces to be experienced in a moving vehicle. Therefore, the primary means employed in such liquid supplying vessels V to assure pure liquid acquisition at opening 15 is in the form of the diaphragm or membrane M within which the liquid body is charged and outside of which a displacement fluid replaceably enters the vessel V through opening 13. As shown, the membrane M is a shell of soft flexible material such as aluminum that is formed to lie contiguously against the interior of the sections 10, 11 and 12 with its perimeter secured to and sealed with the interior of the vessel. The membrane M is sufficiently rigid so as to retain its formed shape initially conforming to the upper half interior of vessel V, and it is sufficiently deformible so as to collapse around the body of stored liquid as and when it is depleted from the vessel V thereby establishing and maintaining a gas-liquid separation between said liquid and a displacement fluid entering into the upper interior of the vessel through charge opening 13. However, there is no provision in the vessel V and membrane M combination to disperse the accumulation of gases developed within the liquid body and below the membrane M, as may be caused by deterioration of said liquid and resulting in the formation of gas.

In accordance with this invention I provide the partition P of ultrafine mesh screen 20 (250 × 1370 mesh) or the like that establishes and maintains the gas-liquid interface between the stored body of liquid and the acquisition opening 15 therefor. A typical location for the acquisition opening 15 is at one end section of the vessel V near the bottom or lowermost side of the vessel or at the centerline of the vessel as shown, and a characteristic feature of the partition P is that it lies near the interior wall of the vessel and in this instance near the bottom of section 10 and end section 11. The ultrafine screen 20 is the surface tension device per se through which all liquid must pass in order to be discharged through the acquisition opening 15. In practice, the mesh of the surface tension screen 20 is such that liquid being drawn from the vessel will readily pass therethrough while entrainments such as foreign particles and particularly gas bubbles will not pass therethrough. Consequently, there is a restriction and/or coalescence of gas at the screen 20 within the liquid storage chamber Y while the liquid is displaced therethrough from chamber Y into the acquisition chamber Z.

In carrying out this invention, the surface tension screen 20 is of substantial area and is a tightly woven fabric of fine metal wire, preferably stainless steel. The screen 20 is therefore inherently flexible but is self supporting by means of pleating the same uniformly into accordion folds 21 that have webs 22; and to the end that the partition P thereof is structurally sufficient to span a substantial distance between the concavity formed by the interior wall of the vessel. Accordingly, the metal fabric of screen 20 is welded or otherwise fused to the shell S that engages contiguously with the interior wall of the vessel to position the screen 20 on a chord line spaced from the interior wall and continued into the hemispherical sections 11 and 12.

The surface tension device is a ski shaped unit comprised of the partition P and the shell S, which together form a chambered body from which the acquisition opening 15 extends. The screen 20 spans transversely on a shallow cord line as shown and to the end that the radial depth and/or volume of the acquisition chamber Z within device X is minimized. The chamber Z is essentially a passage from which liquid is expelled through opening 15. In practice, there is a tubing 25 formed integrally with the wall 26 of shell S, said tubing 25 being received and sealed within the opening 15 so as to transfer liquid from the chamber Z and into said discharge opening 15. As shown throughout the drawings, the wall 26 of shell S is comprised of an elongated semi cylindrical section 30 and opposite hemispherical ends 31 and 32 complementary with the above described sections 10, 11 and 12 of the storage vessel V; and it is these sections of vessel V and device X which are contiguously complementary, with the membrane M disposed therebetween and with its discharge tube 15' sealed within and between the tubing 25 and opening 15.

A feature is the transverse disposition of the accordion folds 21 and structured webs 22 thereof spaced uniformly from the interior wall through the cylindrical vessel section 10 so as to establish an acquisition chamber Z within the storage chamber Y; and correspondingly spaced uniformly from the interior wall of hemispherical section 11 so as to form a radiused partition section 27. In practice, a portion of section 27 is a solid baffle as shown. The complementary portions of the partition P and shell S are fastened and sealed together as by means of a continuous seam of welding, thereby isolating chamber Z from chamber Y; and the said perimeters thereof lie contiguously against the inner surface of membrane M by means of straightening the section 27 and by shaping the surface tension device X to a configuration determined by the limits of said inner surface. The acquisition opening 15, tubing 25 and discharge tube 15' are coaxial with the central axis of the cylindrical vessel section 10 and hemispherical end 11, in which case the section 31 of shell S and overlying section 27 of partition P are extended so that the opening 15 etc. are embraced within the extent of device X and are in open communication with the chamber Z.

From the foregoing it will be seen that the surface tension device X is comprised of a flexible fabric that is pleated so as to become structurally inflexible and sufficient for maintaining a gas-liquid interface through which the liquid passes and gas is restricted. Further, the lineal increase of screen 20 resulting from said pleating multiplies the area of screen exposed to storage chamber Y and subject to the passage of liquid therethrough, while gas is restricted to said chamber Y; and thus the flow of liquid can be substantial. The planar portion of the partition P formed thereby is disposed near the interior wall of the vessel so as to form a minimized acquisition chamber Z while the storage chamber Y remains of maximum volume. The acquisition opening 15 is in open communication with the chamber Z and is essentially a continuation thereof, the liquid passing through the surface tension screen 20 being acquired as pure liquid devoid of gas within chamber Z and subsequently discharged through opening 15. It will be observed that the surface tension device X operates independently of membrane M and that gas is excluded from chamber Z despite the vessels attitudes and application of G forces whatever complex thereof may be imposed. Consequently, the acquisition of pure liquid is assured and the accumulation of unwanted gas within the diaphram of membrane M is confined to the storage chamber Y.

Having described only a typical preferred from and application of my invention, I do not wish to be limited or restricted to the specific details herein set forth, but wish to reserve to myself any modifications or variations that may appear to those skilled in the art:

I claim:

1. A device for acquisition of gas-free liquid from a closed storage vessel having an acquisition opening in one side portion thereof, and including; a collapsible imperforate membrane coextensively lining the interior of the vessel, and a porous surface tension partition juxtapositioned in closely spaced relation to and with its periphery sealed with the membrane and disposed over said side portion of the vessel and the acquisition opening therein and defining a liquid acquisition chamber in open communication with said liquid acquisition opening and separate from a liquid storage chamber within the membrane.

2. The liquid acquisition device as set forth in claim 1 wherein the porous surface tension partition is pleated with the structural folds thereof extending transversely between its opposite supporting perimeters sealed with the said imperforate membrane.

* * * * *